(12) United States Patent
Bramauer

(10) Patent No.: US 11,834,885 B2
(45) Date of Patent: Dec. 5, 2023

(54) METHOD AND DEVICE FOR DETECTING THE WEAR STATE OF A COMPONENT OF A DOOR DRIVE SYSTEM OF A RAIL VEHICLE

(71) Applicant: KNORR-BREMSE GESELLSCHAFT MIT BESCHRÄNKTER HAFTUNG, Mödling (AT)

(72) Inventor: Johann Bramauer, Ybbsitz (AT)

(73) Assignee: KNORR-BREMSE GESELLSCHAFT MIT BESCHRÄNKTER HAFTUNG

( * ) Notice: Subject to any disclaimer, the term of this patent is extended or adjusted under 35 U.S.C. 154(b) by 920 days.

(21) Appl. No.: 16/652,358

(22) PCT Filed: Sep. 28, 2018

(86) PCT No.: PCT/EP2018/076418
§ 371 (c)(1),
(2) Date: Mar. 30, 2020

(87) PCT Pub. No.: WO2019/063770
PCT Pub. Date: Apr. 4, 2019

(65) Prior Publication Data
US 2020/0270927 A1 Aug. 27, 2020

(30) Foreign Application Priority Data

Sep. 29, 2017 (DE) .................. 10 2017 122 819.5
Oct. 20, 2017 (DE) .................. 10 2017 124 599.5

(51) Int. Cl.
*E05F 15/40* (2015.01)
*E05F 15/659* (2015.01)
(Continued)

(52) U.S. Cl.
CPC ............ *E05F 15/40* (2015.01); *B60J 5/0497* (2013.01); *E05F 15/659* (2015.01); *G07C 5/006* (2013.01);
(Continued)

(58) Field of Classification Search
CPC ....... E05F 15/40; E05F 15/659; E05F 15/603; E05F 15/632; B60J 5/0497; G07C 5/006;
(Continued)

(56) References Cited

U.S. PATENT DOCUMENTS 6,150,785 A 11/2000 Butscher et al.
6,343,437 B1 2/2002 Hoffmann et al.
(Continued)

FOREIGN PATENT DOCUMENTS

AT 514887 A2 4/2015
CN 103782467 A 5/2014
(Continued)

OTHER PUBLICATIONS

International Search Report corresponding to PCT/EP2018/076418 dated Jan. 4, 2019.

*Primary Examiner* — Michael V Kerrigan
(74) *Attorney, Agent, or Firm* — Barnes & Thornburg LLP

(57) ABSTRACT

A method detects the wear state of a component of a door drive system of a rail vehicle. The method includes reading a sequence of first motor parameters and second motor parameters, wherein the first motor parameters represent a different physical variable of a motor of the door drive system than the second motor parameters. The method additionally includes checking whether a value which represents the sequence of the first motor parameters satisfies a specified criterion in order to detect the wear state of the component of the door drive system.

14 Claims, 5 Drawing Sheets

(51) Int. Cl.
   *B60J 5/04* (2006.01)
   *G07C 5/08* (2006.01)
   *G07C 5/00* (2006.01)

(52) U.S. Cl.
   CPC ........ *G07C 5/0808* (2013.01); *E05Y 2400/30* (2013.01); *E05Y 2400/458* (2013.01); *E05Y 2800/43* (2013.01); *E05Y 2900/51* (2013.01)

(58) Field of Classification Search
   CPC .............. G07C 5/0808; E05Y 2400/30; E05Y 2400/458; E05Y 2800/43; E05Y 2900/51
   See application file for complete search history.

(56) References Cited

U.S. PATENT DOCUMENTS

| | | | |
|---|---|---|---|
| 6,504,332 | B1 | 1/2003 | Lamm |
| 6,636,814 | B1* | 10/2003 | McCullers ............. B61D 19/02 701/19 |
| 2009/0240401 | A1 | 9/2009 | Rosch |
| 2015/0137963 | A1 | 5/2015 | Yulkowski et al. |
| 2018/0298671 | A1* | 10/2018 | Roppongi ............. E05F 15/659 |

FOREIGN PATENT DOCUMENTS

| | | |
|---|---|---|
| DE | 4214998 A1 | 11/1993 |
| DE | 19718631 A1 | 11/1998 |
| DE | 19941475 A1 | 3/2001 |
| DE | 102004011332 A1 | 9/2005 |
| EP | 2899092 A1 | 7/2015 |
| WO | 2007093419 A1 | 8/2007 |

\* cited by examiner

METHOD AND DEVICE FOR DETECTING THE WEAR STATE OF A COMPONENT OF A DOOR DRIVE SYSTEM OF A RAIL VEHICLE

CROSS REFERENCE AND PRIORITY CLAIM

This patent application is a U.S. National Phase of International Patent Application No. PCT/EP2018/076418 filed Sep. 28, 2018, which claims priority to German Patent Application No. 10 2017 122 819.5 and claims priority to German Patent Application No. 10 2017 124 599.5, the disclosure of which being incorporated herein by reference in their entireties.

FIELD

Disclosed embodiments relate to a method and to a device for detecting a state of wear of a component of a rail vehicle.

BACKGROUND

In conventional door drive systems in rail vehicles, sufficient monitoring of the state of wear of individual components is often not carried out so that when there is excessive wear of these components a door system can fail and therefore the satisfactory operation of the rail vehicle can no longer be ensured.

SUMMARY

Against this background, the disclosed embodiments provide a possible way of improving the detection of a state of wear of a component of the rail vehicle.

Disclosed embodiment provide a method for detecting a state of wear of a component of a door drive system of a rail vehicle includes reading in a sequence of first motor parameters and second motor parameters, wherein the first motor parameters represent a different physical variable of a motor of the door drive systems than the second motor parameters; and testing whether a value which represents the sequence of the first motor parameter satisfies a predetermined criterion to detect the state of wear of the component of the door drive system.

BRIEF DESCRIPTION OF FIGURES

Exemplary embodiments of the presented approach are illustrated in the drawings and explained in more detail in the following description.

Identical or similar elements are provided using identical or similar reference signs in different figures in the following description, wherein for reasons of clarity a repeated explanation of these reference signs is avoided.

DETAILED DESCRIPTION

Figure 1:
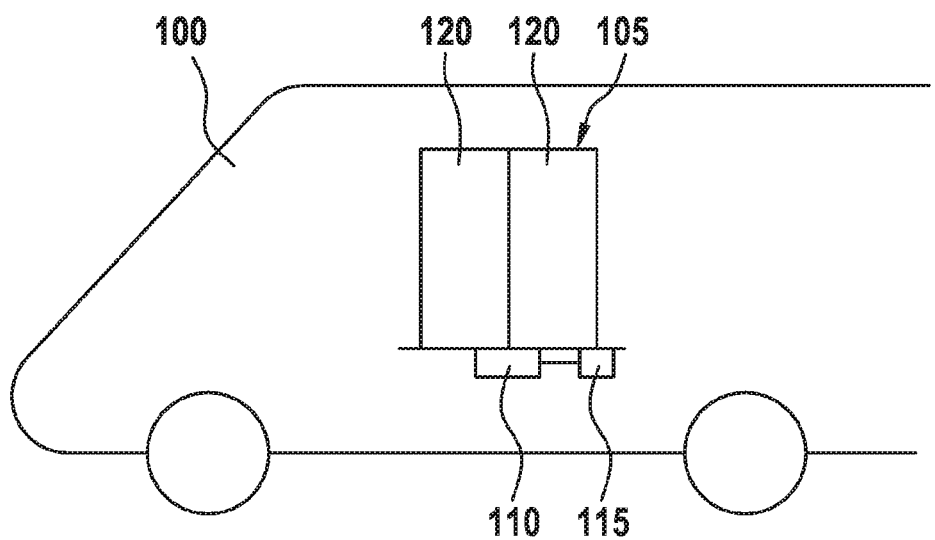
FIG. 1 is an illustration of a rail vehicle for use with an exemplary embodiment of the present invention.

A state of wear can be, for example, a degree of wear of a component, travel or an amount of play between two elements which arises through wear of these elements during operation of the door drive system, or an excessively low or excessively high tension in a belt or some other force transmitting element. A sequence of first motor parameters can be understood to mean, for example, a (time) profile of a physical variable. A sequence of second motor parameters can be understood to be, for example, a profile of the second motor parameters. In this context, the first motor parameters can represent a physical variable which differs from a physical variable which is represented by the second motor parameters. The first motor parameter can also be represented as a function of the second motor parameter, specifically if the motor of the door drive system is operating. A value which is dependent on the sequence of first motor parameters can be understood to be, for example, a characteristic curve which is formed using the sequences of first motor parameters. A predetermined criterion can be understood to be, for example, a threshold value, a tolerance range or the like, with which the sequence of the first motor parameter or at least a value derived therefrom can be compared and when they correspond a predetermined state of wear of the component of the door drive system can be inferred.

The approach presented above is based on the realization that motor parameters and/or relationships between a plurality of motor parameters can be recorded and evaluated in a technically very simple way in order as a result to draw inferences about a state of wear of the component of the door drive system. In this way it is possible to detect a state of wear of the component of the door drive system very easily and early and to exchange this component if necessary so that the rail vehicle can continue to be operated in the desired operating state, and the risk of failure of the component is largely minimized.

In one specific embodiment of the approach proposed here, in the reading, the first motor parameters can be related to second motor parameters, in particular wherein in each case a first motor parameter of the sequence of first motor parameters is related to a second of the sequence of second motor parameters, and/or wherein a characteristic curve is determined which represents a dependence of the first motor parameter on the second motor parameters. Such a variant of the approach proposed here provides the advantage of indicating a relationship between the first and second motor parameters which significantly facilitates detection of the state of wear of a component the door drive system.

An embodiment of the approach proposed here is particularly favorable in which in the input, a motor current of an electric motor of the door drive system is read in as a first motor parameter, and/or a moving path and/or a rotational angle of an axle of the motor of the door drive system is read in as a second motor parameter, in particular wherein in the input, the first motor parameter is made available as dependent on a movement path and/or rotational angle of the motor as a second motor parameter. Such an embodiment provides the advantage of being able to use very reliable and easy to record signals to assess the state of wear of the component.

An embodiment of the approach proposed here is particularly advantageous in which in the testing, the steepness and/or the curvature behavior of a characteristic curve which represents the sequence of first motor parameters is tested at at least one point to detect the state of wear of the component of the door drive system. The steepness can be determined here, for example by forming a first derivative at a location of the sequence of first motor parameters (for example as a function of or in relation to the second motor parameters), so that at this point the sequence of first motor parameters is differentiated. To assess the curvature behavior, for example a second derivative can be determined at the location of the sequence of first motor parameters. Such an embodiment of the approach proposed here provides the advantage of being able to execute an efficient analysis through the technically very easy to record signals so that the state of wear of the component can be determined therefrom very easily and precisely.

A further embodiment of the approach proposed here is also conceivable in which in the testing, the steepness and/or the curvature behavior of the characteristic curve which represents the sequence of first motor parameters is compared with a threshold value as a predetermined criterion, to detect the state of wear of the component. Such an embodiment provides the advantage of implementing the testing, in a technically very easy way and nevertheless providing a sufficiently reliable possible way of detecting the current state of wear of the component.

According to another embodiment of the approach proposed here in the testing, the state of wear of the component can be detected if the characteristic curve which represents the sequence of first motor parameters has, as a predetermined criterion, at least one change of sign of the curvature behavior, in particular two changes of sign of the curvature behavior, and/or has a steepness which is greater than or less than a predetermined threshold value. A curvature behavior which has a change of sign can be understood to be an inflection point of the characteristic curve. Such an embodiment of the approach proposed here can be implemented with mathematically very simple means.

An embodiment of the approach proposed here in which in the testing operation, depending on the value, a voltage of a force transmission element outside a voltage range is determined, a degree of elasticity of a buffer element which is outside an elasticity range is determined, and/or an amount of play of a linear drive system which lies outside a play range is determined as a state of wear of the component of the door drive systems is technically particularly relevant. Such an embodiment provides the advantage that using the approach proposed here it is possible to determine a state of wear of components of the door drive system which are subjected to particularly heavy use and therefore are highly susceptible to wear. In this respect, the operational safety and fail safety of the rail vehicle can be improved significantly by such a determination of the state of wear of the specified components.

Furthermore, an embodiment of the approach proposed here is favorable in which in the input, a temperature parameter which represents the ambient temperature is also read in, wherein in the testing, the state of wear of the component of the door drive systems is detected using the temperature parameter. An ambient temperature can be understood to be a temperature in the direct vicinity of the component. Such an embodiment provides the advantage of taking into account material properties which are often temperature dependent such as an elasticity or stresses in the assessment of the state of wear of the component, as a result of which the state of wear can be detected or determined more precisely.

According to a further embodiment of the approach proposed here, before the input, a, of arresting and/or of retarding at least one component of the door drive systems is performed. Arresting and/or retarding of at least one component of the door drive system can be understood to be locking or braking of the component of the door drive system in one or more directions of movement. In this way, the state of wear of the component of the door drive system can be determined very efficiently, since the play, perhaps as a result of wear, in the movement of the component of the door drive system can be revealed or determined.

An embodiment of the present approach is particularly advantageous in which in the arresting, at least one of a plurality of components of the door drive system is arrested, wherein in the testing, the state of wear of a non-arrested component is detected using the value. Alternatively or additionally, the operations can be executed repeatedly with a different state of arresting and/or retarding of one or more components of the door drive system, wherein in the last testing, the sequence of the first values representing motor parameters are compared with one another in different retarded and/or arrested states of the components, to detect the state of wear of a component of the door drive system. Such an embodiment of the approach proposed here provides the advantage of being able to detect better, as a result of the arresting of one of the components, the state of wear of another, non-arrested component, particularly if the arrested component(s) is/are also subject to a certain amount of wear, and therefore an incorrect inference about the wear of a specific component (for example the non-arrested one) can be drawn from the motor parameter or parameters. As a result of the arresting of one of the components, a better differentiation of the detection of the state of wear of the individual component can therefore be made possible. Even the state of wear of one of the involved components can be determined very precisely under different retarded and/or arrested states of the components using a comparison of the values representing the sequence of motor parameters.

According to a further embodiment, in the testing, a value which represents the remaining service life is determined as the state of wear of the component of the door drive system. In this way, the operating state of components of the door drive system can be easily estimated and/or a prediction can be made about maintenance outlay which would be necessary in the future. In addition, sample-probe-like verification of determined indicators is also conceivable, for example using manual testing/measurement on the product or the component and/or recording.

In addition, an embodiment of the approach proposed here in which the operations of the method are executed repeatedly, wherein a time profile of a value which represents the state of wear of the component of the door drive systems is recorded. For example, a value which represents the state of wear of the component of the door drive system can be acquired every time the operations of the method are run through and can be compared with one or more subsequently acquired values which represent the state of wear of the component of the door drive system. For example, for this purpose the components can also be placed in different arrested states (for example arrested in a pass and released in a subsequent pass, or vice versa), as a result of which the component can be subjected to a test state of wear which is very flexible and very quick to carry out. In this way, the gradual wear of the component of the door drive system can be advantageously monitored and also the component can be promptly replaced to ensure the operational reliability and readiness to use of the rail vehicle with as much certainty as possible.

The approach proposed here also provides a device which is designed to carry out, actuate and/or implement the operations of one variant of a method presented here in corresponding devices.

In accordance with disclosed embodiments, the device can have at least one computing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded in a communication protocol. The computing unit can be, for example, a signal processor, a microcontroller or the like, wherein the memory unit can be a flash memory, an EEPROM or a magnetic memory unit. The communication interface can be designed to read in or output data in a wireless fashion and/or line-bound fashion, wherein a communication interface can read in or output the line-bound data, can read in this data, for example, electrically or optically from a corresponding data transmission line or can output the data into a corresponding data transmission line.

A device can be understood here to be an electrical device which processes sensor signals and outputs control signals and/or data signals as a function thereof. The device can have an interface which can be embodied using hardware and/or software. In the case of a hardware embodiment, the interfaces can be, for example, part of what is referred to as a system ASIC which includes a wide variety of functions of the device. However, it is also possible for the interfaces to be separate, integrated circuits or to be composed at least partially of discrete components. In the case of a software embodiment, the interfaces can be software modules which are present, for example, on a microcontroller next to other software modules.

A computer program product or a computer program with program code which can be stored on a machine-readable carrier or storage medium such as a semiconductor memory, a hard disk memory or an optical memory and used to carry out, implement and/or actuate the operations of the method according to one of the embodiments described above is also advantageous, in particular when the program product or program is run on a computer or a device.

FIG. 1 shows an illustration of a rail vehicle 100 whose door 105 for the entry of passengers into the interior of the rail vehicle 100 is driven by a door drive system 110 with an electric motor 115. The door drive system 110 can hereby be designed in such a way as to move door wings 120 of the door 105 apart from one another when the door 105 opens or to move them toward one another when the doors 105 close. Since such a door drive system 110 is subjected to a higher level of continuous loading while the rail vehicle 100 is operating, individual components of such a door drive system 110, such as for example drive belt for the transmission of force, rubber buffer for absorbing shocks of the door wings 120 on end stops of the movement travel or spindle in the form of a linear drive for driving the movement of the door wings 120, experience wear marks which in the long run can lead to failure of the door drive system 110. In this case, the door 105 would no longer be able to be used for passengers to enter or exit the rail vehicle 100, as a result of which the operation of the rail vehicle 100 is impeded so that for example, the stopping times of the rail vehicle 100 at stopping stations are lengthened since the passengers can enter/exit the rail vehicle 100 through fewer doors 105.

Figure 2:
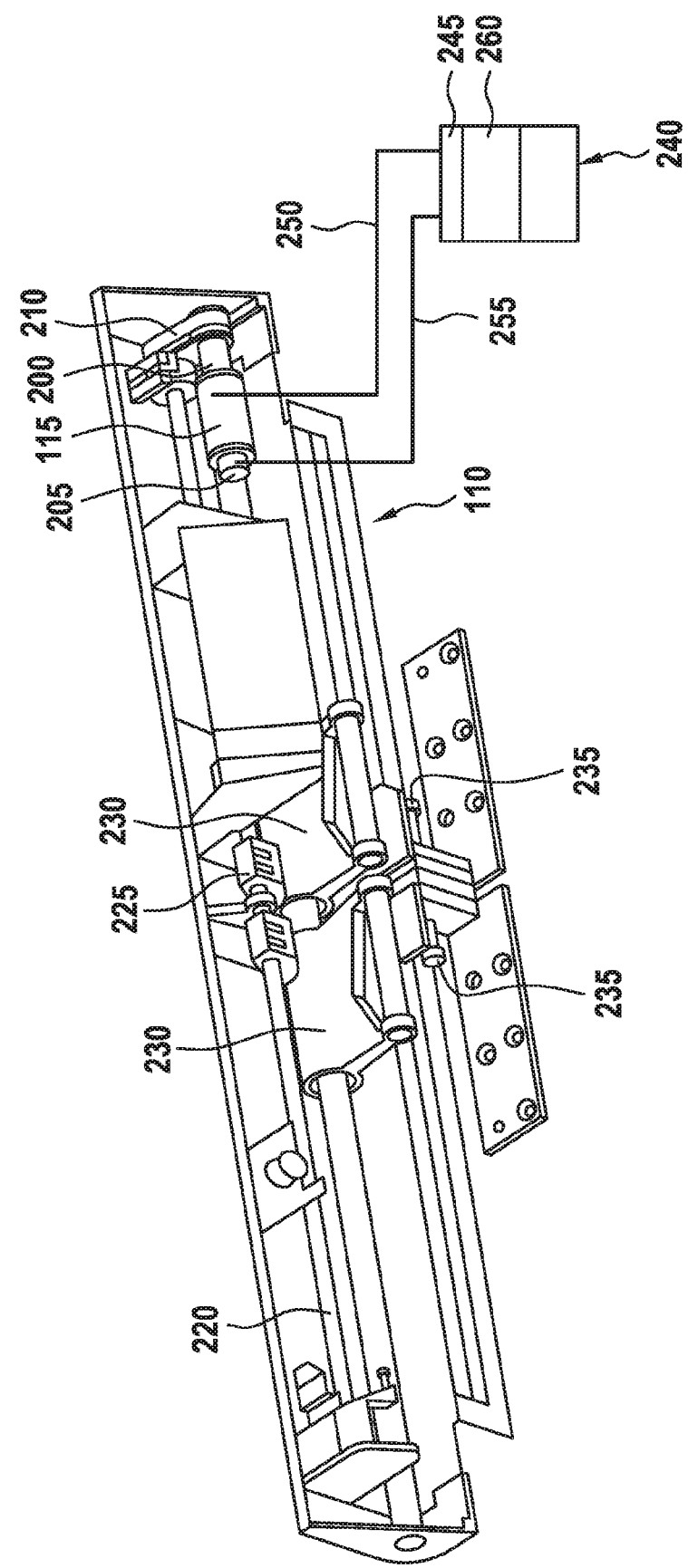
FIG. 2 shows a view of an exemplary door drive system with different components and a device according to an exemplary embodiment.

FIG. 2 shows a view of an exemplary door drive system 110 which is driven by the motor 115, present here in the form of an electric motor. In this context, the door drive system 110 comprises an axle or a transmission 200 which has, for example, a position encoder 205 for recording a current rotational angle or a rotational angle profile of the axle of the motor 115, wherein this rotation angle or rotational angle profile can also be understood to be a distance or movement travel of the axle of the motor 115. Furthermore, FIG. 2 shows a belt 210 which acts as a force transmission element of a force from the transmission 200 or a shaft of the motor 115 on a linear drive element 220. The linear drive element 220 has in this case, for example, a spindle nut 225 which is movably mounted on a thread of the linear drive element 220 and which is coupled, for example, to door-securing elements 230. Therefore while the motor 115 is operating these door-securing elements 230, to which the door wings 120 (not illustrated in FIG. 2) can be attached, carry out opening or closing of the respective door wing 120 or of the door 105. In order then to keep mechanical wear as low as possible, a buffer element 235 (for example in the form of a rubber buffer) can also be provided, the buffer element 235 being arranged at one end of the movement travel of a door of a securing element 230 so that material loading when the door-securing element 230 or the door wing 120 impacts can be kept as low as possible.

To avoid a situation in which, as already stated above, excessive wear of components of the door drive system 110 brings about a failure, a device 240 for detecting a state of wear of a component of the door drive system 110 can be provided. In this device 240, which is configured, for example, as a DCU, a read-in interface 245 is provided to read in a sequence of a first motor parameter 250 as a function of a second motor parameter 255. For example, the first motor parameter 250 can be a flow of current and/or a profile of the flow of current which flows through windings of a motor 115 which is embodied as an electric motor. The second motor parameter 255 can be, for example, the rotational angle specified above, a profile of the rotational angle or a distance of the revolutions of the axle of the motor 115. In this respect, a relationship between the first motor parameter 250 and the second motor parameter 255 can be determined or established, for example in the form of a characteristic curve of the first motor parameter 250 as a function of the second motor parameter 255, in the read-in interface 245 in the device 240. This relationship can then be examined with respect to a predetermined criterion for example, a device 260 for testing the first motor parameter 250 (to be more precise the relationship of the first motor parameter 250 with the second motor parameter 255) to detect the state of wear of a component of the door drive system 110, for example a state of tension of the belt 210, play or idle travel of the spindle nut 225 in the linear drive element 220 which is embodied, for example, as a threaded rod, or spring compression travel of the buffer element 235.

Specifically, in this context the state of wear of the component of the door drive system 110 can be detected directly the rail vehicle 100. However, an exemplary embodiment of the approach presented here is also conceivable, in which the detection of the state of wear of the component of the door drive system 110 is carried out outside the rail vehicle 100, for example on a mobile computer such as a laptop or a smartphone or in a central computer, for example in a workshop for the rail vehicle 100.

An exemplary embodiment of the approach presented here is also conceivable, in which arresting, retarding, braking and/or locking of at least one component of the door drive system 100 takes place before the reading in of the motor parameters. For example, a movement of the transmission 200 or of the linear drive element 220 in one or more directions of movement can be blocked by the engagement of a pin (not illustration in FIG. 2) so that when the motor 115 has nevertheless operated and the motor parameters are read in it is possible to draw an inference as to the movement travel of the respective component of the door drive system 110, which permits an inference to be drawn about the state of wear of this respective component of the door drive system 110.

Figure 3:
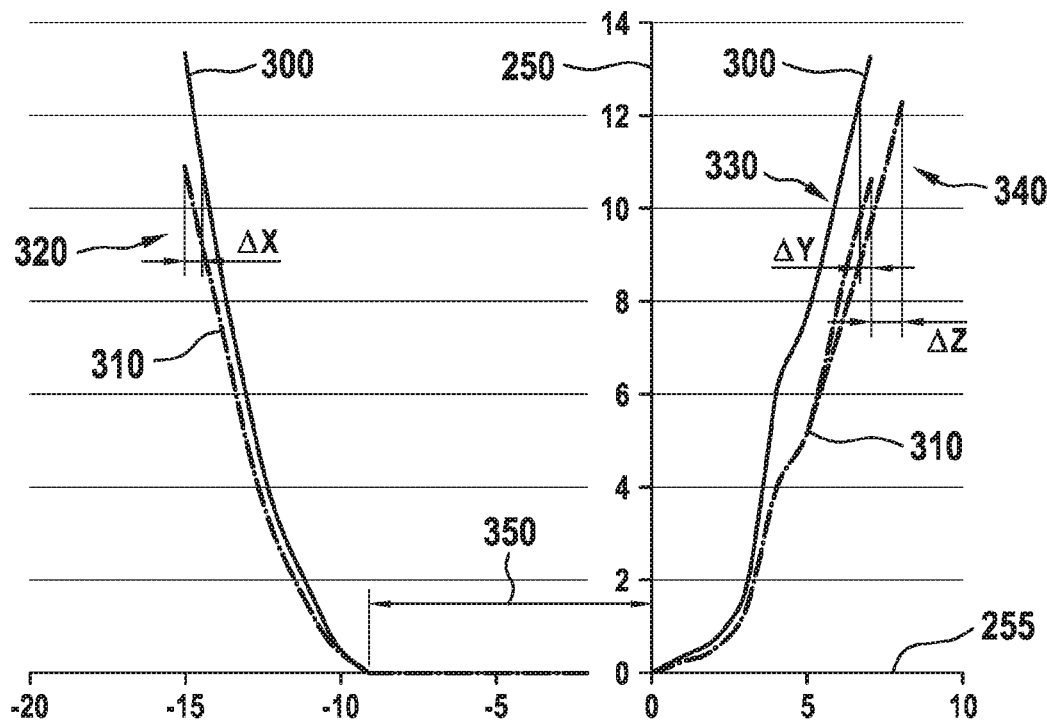
FIG. 3 shows a diagram with illustrations of relationships between the first motor parameter (which is depicted on the ordinate) as a function of the second motor parameter (which is depicted on the abscissa)

FIG. 3 shows a diagram with illustrations of relationships between the first motor parameter 250 (which is depicted on the ordinate) as a function of the second motor parameter 255 (which is depicted on the abscissa). The first motor parameter 250 represents here a value of a flow of current (in amperes) through at least one winding of the electric motor as a motor 115, while the second motor parameter 255 represents a rotational angle of an axle of the motor 115 (in degrees). It is possible to see two curves 300 and 310 which depict, for example at different times, a relationship between the motor current as a first parameter 250 and the rotational angle as a second parameter 255. An analysis of the curves 300 or 310 then permits, for example, the formation of a derivative or the determination of a gradient at individual points on these curves 300 or 310, to determine a state of wear of a component of the door drive system 110. It is then possible to determine, for example, in the region 320 and in the region 330, a gradient ΔX and ΔY of the curves 300 and 310 (according to the absolute value) which indicates a belt 210 under strong tension. In the region 340 ΔZ of the diagram in FIG. 3 it is possible to see that the courses relationship second characteristic curve 310 extends beyond a significantly larger (positive) range of the rotational angle as a second parameter 255, which indicates a defective buffer element 235, since in this case the movement travel is significantly longer. It is also possible to see in the region 350 that when there is a minimum flow of current as the first motor parameter 250 a very large rotational angle range can be run through as a second motor parameter 255 so that idle travel or play of the spindle nut 225 on the linear drive element 220 can be inferred. Such inferences can be drawn, for example, that in the testing device 260 the sequence or the profile of first motor parameters 250 which is related to the second motor parameter 255 is compared with a predetermined criterion, for example a threshold value for the steepness of the characteristic curve 300 or 310 at a specific point or a specific location in the rotational angle range to detect tension (diminishing or excessively strong) of a belt such as the belt 210, a possible lengthened movement travel which occurs from the characteristic curve 300 or 310 in the region or specific rotational angles to detect defective buffer elements 235 and/or flatness of the characteristic curve in 300 or 310 in the region of a low value for a flow of current through at least one winding of the motor 115 and/or in the region of a small rotational angle.

Figure 4:
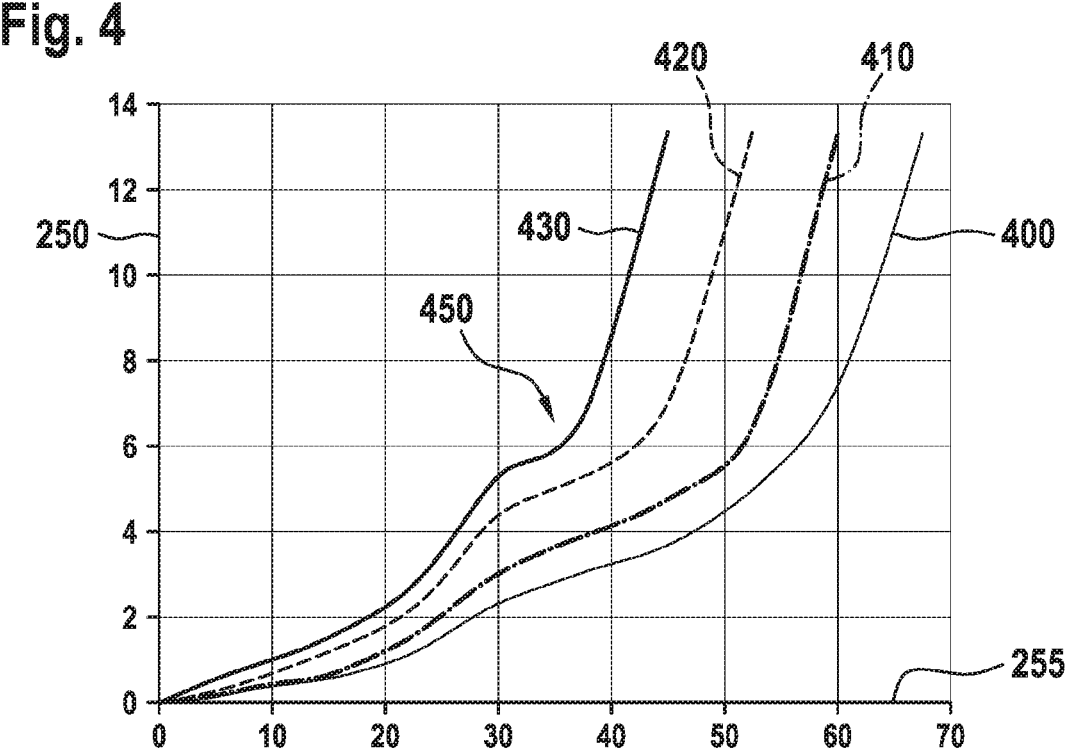
FIG. 4 shows a diagram illustration explaining the detection of belt tension as a state of wear of a component of the door drive systems.

FIG. 4 shows a diagram illustration explaining the detection of belt tension as a state of wear of a component of the door drive system 110. In this context, the rotational angle is plotted again as a second motor parameter 255 on the X axis (abscissa), and the current through to is a winding of the motor 115 as a first motor parameter 250 on the ordinate. A first characteristic curve 400 characterizes here the profile of the relationship between the first motor parameter 250 and the second motor parameter 255 in the case of a minimum belt tension of 7 millimeters at 20 N, while the second characteristic curve 410 characterizes a medium belt tension of 5.5 millimeters at 20 N, a third characteristic curve 420 characterizes a maximum belt tension at 4 millimeters at 20 N, and a fourth characteristic curve 430 characterizes an even higher belt tension of 2.2 millimeters at 20 N. In particular in the case of the third characteristic curve 420 and the fourth characteristic curve 430 it is apparent that a plateau is formed represented in the region 450, which plateau is distinguished by two turning points, which can be clearly recognized, in the characteristic curves 420 and 430. In this respect, an inference can be drawn about a voltage state of a regiment as a component of the door drive unit 110 by evaluating the curve behavior, using which the inflection point can be determined.

Figure 5:
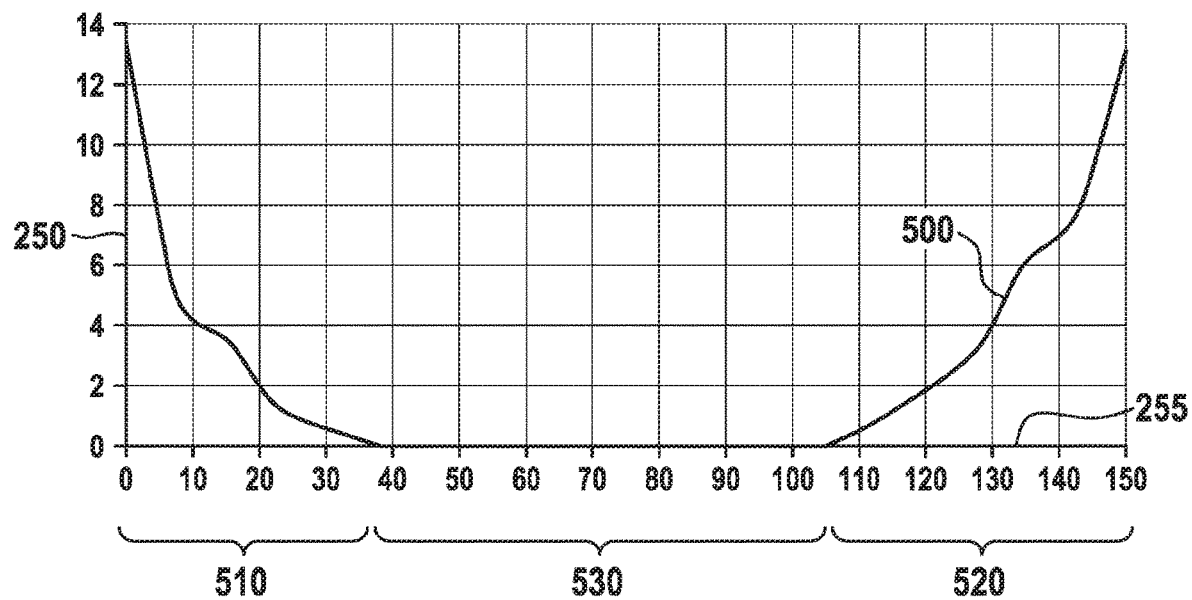
FIG. 5 shows a diagram explaining the possible way of detecting play in the drive train or corresponding idle travel.

FIG. 5 shows a diagram explaining the possible way of detecting play in the drive train or of detecting corresponding idle travel. This idle travel corresponds, for example, to the play of the spindle nut 225 and can also contain other tolerances such as, for example a feather key on the gearwheel or the like, but which hardly change and therefore do not have any effect or any significant effect on the play of the spindle nut 225. The diagram in FIG. 5 in turn illustrates a characteristic curve 500 which illustrates the profile of the first motor parameter 250 as a function of the second motor parameter 255. In a first region 510, extension of a belt during the closing of the door wing 120 can be seen, while in the second region 520 extension of the belt during the opening of the door wing 120 can be represented. In a third, middle region 530, the characteristic curve 500 extends in a very flat fashion at a value of the flow of current through at least one winding of the motor 115 at virtually zero over a very large part of the rotational angle as a second motor parameter 255, so that it can be inferred from this that a component of the door drive system 110 can be moved very easily, so that it can be inferred that there is a large amount of play of the spindle 225.

Figure 6:
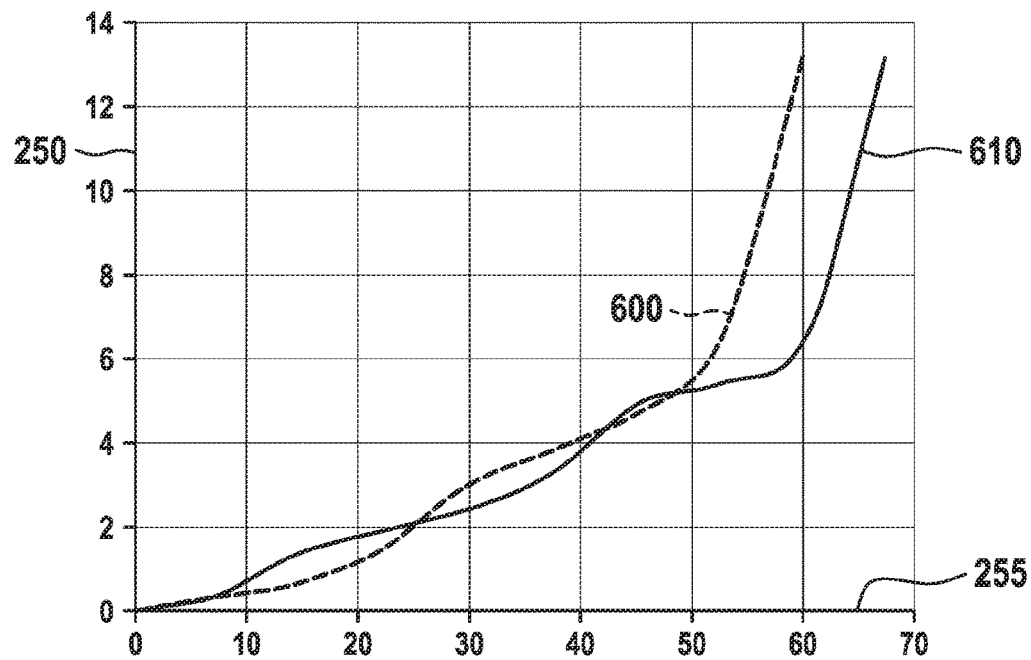
FIG. 6 shows a diagram of the detection of the state of wear or the aging of a buffer element such as the rubber buffer from FIG. 2 as a component of the door drive system.

FIG. 6 shows a diagram of the detection of the state of wear or of the aging of a buffer element such as the rubber buffer 235 from FIG. 2 as a component of the door drive system 110. In turn, respecitively, the characteristic curves 610 and 620 are shown, wherein the characteristic curve 610 illustrates the relationship between the first motor parameter and the second motor parameter in the case of a functionally capable buffer element 235, while the second characteristic curve 620 represents the relationship between the first motor parameter 250 and the second motor parameter 255 in the case of a hardened or worn buffer element with corresponding reduced elasticity. This is apparent from the fact that the characteristic curve 620 has a high value for the first motor parameter 250 (flow of current through to the is a winding of the motor 115) in the case of an already significantly smaller rotational angle as a second motor parameter 255.

Figure 7:
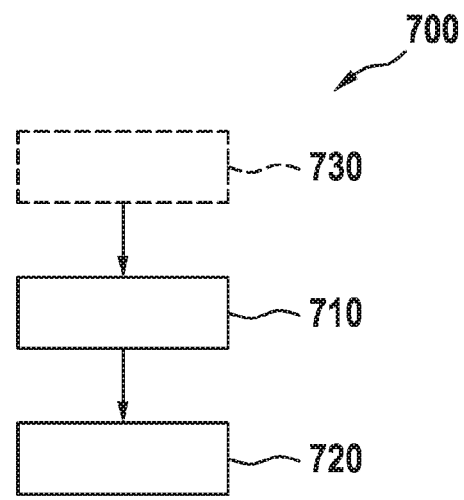
FIG. 7 shows a flow diagram of a method for detecting a state of wear of a component of a door drive system of a rail vehicle.

FIG. 7 shows a flow diagram 700 of a method for detecting a state of wear of a component of a door drive system of a rail vehicle. The method 700 comprises the, 710 of reading in a sequence of first motor parameters and second motor parameters, wherein the first motor parameters represent a different physical variable of a motor of the door drive system than the second motor parameters. Furthermore, the method 700 comprises a, 720 of testing whether a value which represents the sequence of the first motor parameter satisfies a predetermined criterion to detect the state of wear of the component of the door drive system.

In summary it is to be noted that with the approach presented here arresting of the door is presented in the half-open position using a device with which, for example, it is possible to start a testing run which moves the doors to and fro, and when a resistance is reached powers up the current in a regulated fashion to sense the elasticity/play of the drive train or of a component thereof. For example, belt tension, spindle wear or play in connecting elements can be detected in this way. Differentiation of the state of wear of the respective elements can be carried out by evaluating the profile of the characteristic curve, for example also in combination with other parameters such as e.g. the ambient temperature, since such a temperature influences, for example, the elasticity of components of the door drive system. From exemplary embodiment of the approach presented here with an optional first, 730 of arresting and/or retarding at least one component of the door output system which is executed before the input, 710 is also advantageous. In one favorable exemplary embodiment, in the arresting, 730 at least one of a plurality of components of the door drive system can also be arrested and/or retarded, wherein then in the testing, 720 using the value an indication of the state of wear of a non-arrested component is then detected. Alternatively or additionally, the operations of the method 700 can be executed repeatedly with a different state of arresting and/or retarding of one or more components of the door drive system, wherein in the last testing, 720 values representing the sequence of the first motor parameters are compared with one another in the different retarded and/or arrested states of the components to detect the state of wear of a component of the door drive system. In this way it is then possible to be able to detect the state of wear of a component (here the non-arrested one) in an optimum way, specifically even if other components of the door drive system are subject to wear, so that otherwise a "state of wear" of a plurality of components could be detected together from the motor parameters. By comparing values which are based on a retarded and/or arrested component, on the one hand, and on a non-retarded and/or non-arrested component, on the other, it is also possible to make very precise statements about the state of comparison of one of the components.

If an exemplary embodiment comprises an "and/or" conjunction between a first feature and a second feature, this is to be understood as meaning that the exemplary embodiment according to one implementation has both the first feature and the second feature, and according to a further implementation has either only the first feature or only the second feature.

LIST OF REFERENCE NUMBERS

100 Rail vehicle
105 Door
110 Door drive system
115 Motor, electric motor
120 Door wing
200 Transmission
205 Rotational angle encoder, position encoder, rotational angle sensor
210 Belt, force-transmitting element
220 Linear drive element
225 Spindle nut
230 Door-securing elements
235 Buffer element
240 Detection device
250 First motor parameter
255 Second motor parameter
260 Testing device
300 Characteristic curve
310 Characteristic curve
320 First region
330 Second region
340 Third region
350 Fourth region
400 Characteristic curve
410 Characteristic curve
420 Characteristic curve
430 Characteristic curve
450 Plateau region
500 Characteristic curve
510 Region
520 Region
530 Region
610 Characteristic curve
620 Characteristic curve
700 Detection method
710 Input,
720 Testing operation
730 Arresting operation

The invention claimed is:

1. A method for detecting a state of wear of a component of a door drive system of a rail vehicle, wherein the method comprises:
   reading in a sequence of first motor parameters and second motor parameters, wherein the first motor parameters represent a different physical variable of a motor of the door drive system than the second motor parameters; and
   testing whether a value which represents the sequence of the first motor parameters satisfies a predetermined criterion in order to detect the state of wear of the component of the door drive system.

2. The method of claim 1, wherein, in the reading, the first motor parameters are related to the second motor parameters, wherein in each case a first motor parameter of the sequence of first motor parameters is related to a second of the sequence of second motor parameters, and/or wherein a characteristic curve is determined which represents a dependence of the first motor parameter on the second motor parameters.

3. The method of claim 1, wherein in the reading, a motor current of an electric motor of the door drive system is read in as the sequence of first motor parameters, and/or a moving path and/or a rotational angle of an axle of the motor of the door drive system is read in as the sequence of second motor parameters, wherein in the reading, the sequence of first motors parameter is made available as dependent on the moving path and/or the rotational angle of the motor as the sequence of second motor parameters.

4. The method of claim 1, wherein the testing includes testing a steepness and/or a curvature behavior of a characteristic curve which represents the sequence of first motor parameters at at least one point to detect the state of wear of the component of the door drive system.

5. The method of claim 4, wherein the testing further includes comparing the steepness and/or the curvature behavior of the characteristic curve which represents the sequence of first motor parameters with a threshold value as the predetermined criterion, in order to detect the state of wear of the component.

6. The method of claim 4, wherein the testing further includes detecting the state of wear of the component if the characteristic curve which represents the sequence of first motor parameters has, as the predetermined criterion, at least one change of sign of the curvature behavior, in particular two changes of sign of the curvature behavior, and/or has a steepness which is greater than or less than a predetermined threshold value.

7. The method of claim 1, wherein the testing includes, depending on the value, determining a voltage of a force transmission element outside a voltage range, and/or determining a degree of elasticity of a buffer element which is outside an elasticity range, and/or determining an amount of play of a linear drive system which lies outside a play range as the state of wear of the component of the door drive system.

8. The method of claim 1, wherein the reading including reading in a temperature parameter which represents the ambient temperature, wherein in the testing, the state of wear of the component of the door drive system is detected using the temperature parameter.

9. The method of claim 1, wherein, before the reading in, the method further comprises arresting and/or of retarding at least one component of the door drive system.

10. The method of claim 1, wherein, in the arresting, at least one of a plurality of components of the door drive system is arrested, wherein in the testing, the state of wear of a non-arrested component is detected using the value, and/or wherein the reading in, testing, and arresting are executed repeatedly with a different state of arresting and/or retarding of one or more components of the door drive system, wherein in a last testing step the sequence of the first values representing motor parameters are compared with one another in different retarded and/or arrested states of the components, to detect the state of wear of a component of the door drive system.

11. The method of claim 1, wherein in the testing, a value which represents the remaining service life is determined as the state of wear of the component of the door drive system.

12. The method of claim 1, wherein in the reading in, testing and arresting of the method are executed repeatedly, wherein a time profile of a value which represents the state of wear of the component of the door drive system is recorded.

13. A device which is configured to execute and/or actuate a method for detecting a state of wear of a component of a door drive system of a rail vehicle in corresponding units, wherein the method includes detecting a state of wear of a component of a door drive system of a rail vehicle, reading in a sequence of first motor parameters and a sequence of second motor parameters, wherein the first motor parameters represent a different physical variable of a motor of the door drive system than the second motor parameters, and testing whether a value which represents the sequence of the first motor parameters satisfies a predetermined criterion in order to detect the state of wear of the component of the door drive system.

14. A non-transitory computer readable medium including a computer program which is configured to execute and/or actuate a method for detecting a state of wear of a component of a door drive system of a rail vehicle wherein the method includes detecting a state of wear of a component of a door drive system of a rail vehicle, reading in a sequence of first motor parameters and second motor parameters, wherein the first motor parameters represent a different physical variable of a motor of the door drive systems than the second motor parameters, and testing whether a value which represents the sequence of the first motor parameter satisfies a predetermined criterion in order to detect the state of wear of the component of the door drive system.

* * * * *